(12) United States Patent
Hu

(10) Patent No.: US 11,307,887 B2
(45) Date of Patent: Apr. 19, 2022

(54) SERVER DEPLOYMENT METHOD AND SYSTEM IN HYPERVISOR ARCHITECTURE

(71) Applicant: American Megatrends International, LLC, Norcross, GA (US)

(72) Inventor: Chih-Kai Hu, Taipei (TW)

(73) Assignee: AMERICAN MEGATRENDS INTERNATIONAL, LLC, Norcross, GA (US)

( * ) Notice: Subject to any disclaimer, the term of this patent is extended or adjusted under 35 U.S.C. 154(b) by 318 days.

(21) Appl. No.: 16/700,524

(22) Filed: Dec. 2, 2019

(65) Prior Publication Data

US 2021/0165674 A1    Jun. 3, 2021

(51) Int. Cl.
   *G06F 9/455* (2018.01)
   *H04L 67/06* (2022.01)
   *G06F 8/61* (2018.01)
   *G06F 8/60* (2018.01)
   *H04L 61/5014* (2022.01)

(52) U.S. Cl.
   CPC ............ *G06F 9/45558* (2013.01); *G06F 8/60* (2013.01); *G06F 8/61* (2013.01); *G06F 9/45533* (2013.01); *H04L 61/2015* (2013.01); *H04L 67/06* (2013.01); *G06F 2009/4557* (2013.01); *G06F 2009/45591* (2013.01); *G06F 2009/45595* (2013.01)

(58) Field of Classification Search
   None
   See application file for complete search history.

(56) References Cited

U.S. PATENT DOCUMENTS

| | | | |
|---|---|---|---|
| 2010/0107155 A1* | 4/2010 | Banerjee | G06F 8/60 717/177 |
| 2012/0131179 A1* | 5/2012 | Hu | G06F 11/302 709/224 |

* cited by examiner

*Primary Examiner* — Qing Yuan Wu
(74) *Attorney, Agent, or Firm* — Birch, Stewart, Kolasch & Birch, LLP

(57) ABSTRACT

A server deployment method and system in a hypervisor architecture are disclosed. The server deployment method, applied between a deployment management platform and at least one deployed server, includes steps of: (a) the deployed server requesting an internet protocol (IP); (b) the deployment management platform distributing the IP; (c) the deployed server requesting an agent; (d) the deployment management platform delivering the agent; (e) the deployed server automatically joining the deployment management platform; (f) the deployment management platform mounting a hard disk shared by the deployed server; (g) the deployment management platform selecting the type of central processing unit (CPU) and installing an operating system to the hard disk shared by the deployed server; and (h) establishing a connection of a monitor screen between the deployment management platform and the deployed server.

20 Claims, 3 Drawing Sheets

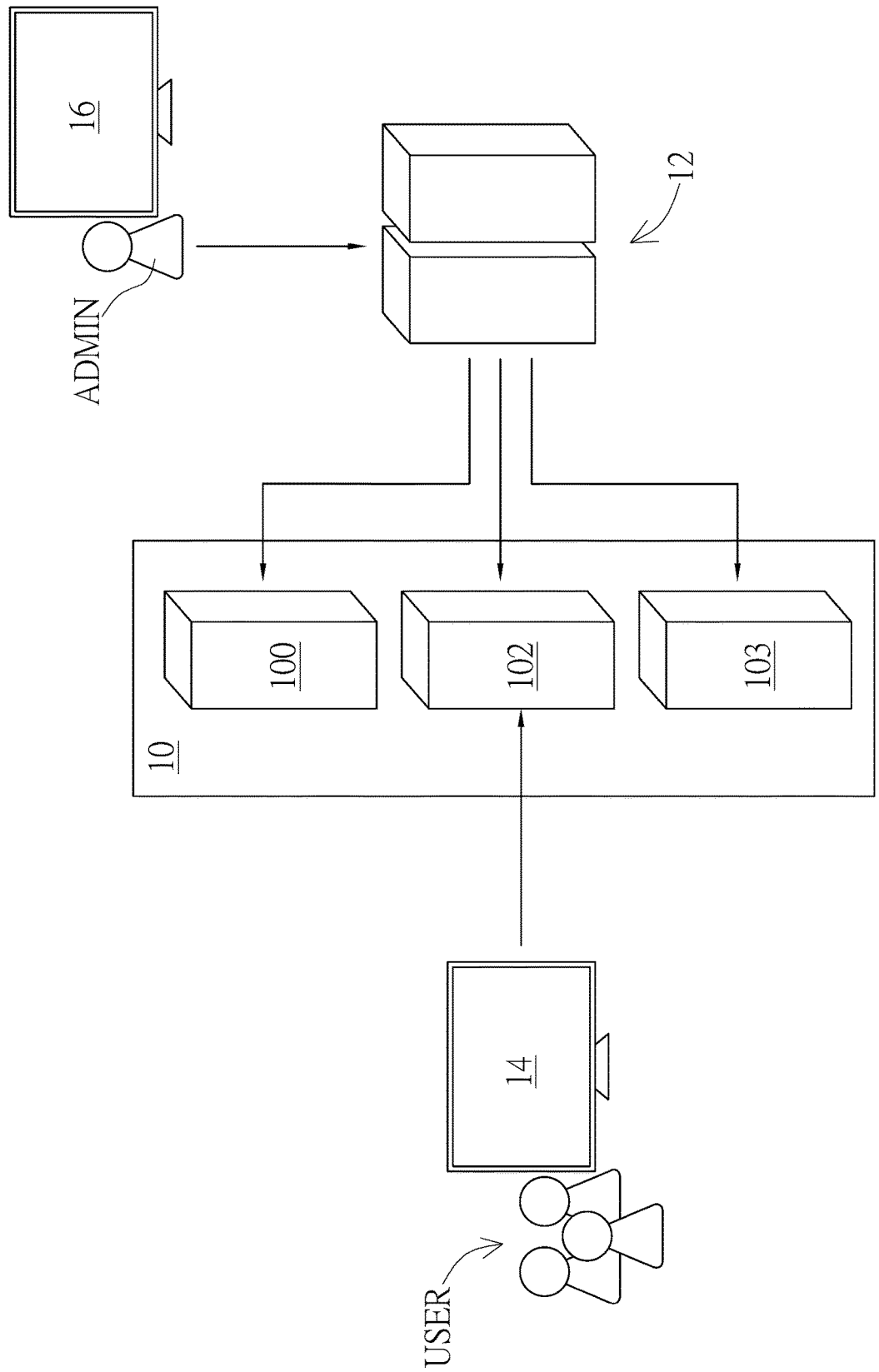

SERVER DEPLOYMENT METHOD AND SYSTEM IN HYPERVISOR ARCHITECTURE

BACKGROUND OF THE INVENTION

1. Field of the Invention

The invention relates to server deployment; in particular, to a server deployment method and system in a hypervisor architecture.

2. Description of the Prior Art

In general, when the user wants to remotely install an operating system (OS) to a deployed server, it usually needs the support of a related device or a related software.

For example, when the OS of the deployed server is installed remotely, the related device such as a keyboard-video-mouse (KVM) switch over internet protocol (IP) or the related software such as a remote monitoring software built in the baseboard management controller (BMC) is necessary, so that the user can see the remote instant installation screen. The complex remote operating system installation services will cause many restrictions and inconveniences for the user.

In addition, it can be suitable only for the remote installation service supported by specific OS such as Linux or Windows.

For example, kickstart can be used in the OS of Linux or RIS can be used in the OS of Windows and the remote installation service can be performed by a remote boot method such as the pre-boot execution environment (PXF). However, the user cannot see any remote instant installation screen. If there is a problem with the remote installation of OS, the user is completely unaware of this situation and cannot do any immediate processing.

SUMMARY OF THE INVENTION

Therefore, the invention provides a server deployment method and system in a hypervisor architecture to solve the above-mentioned problems of the prior arts.

A goal of the invention is to enhance the reliability of the operating system installation on the remote deployed server.

Another goal of the invention is to simplify the deployment process of remote servers to achieve rapid remote server deployment.

Still another goal of the invention is to establish a template for the remote server deployment system.

A preferred embodiment of the invention is a server deployment method in a hypervisor architecture. In this embodiment, the server deployment method is applied between a deployment management platform and at least one deployed server. The server deployment method includes steps of: (a) the deployed server requesting an internet protocol (IP); (b) the deployment management platform distributing the IP; (c) the deployed server requesting an agent; (d) the deployment management platform delivering the agent; (e) the deployed server automatically joining the deployment management platform; (I) the deployment management platform mounting a hard disk shared by the deployed server; (g) the deployment management platform selecting the type of central processing unit (CPU) and installing an operating system to the hard disk shared by the deployed server; and (h) establishing a connection of a monitor screen between the deployment management platform and the deployed server.

In an embodiment, in the step (a), the deployed server requests the 11) through a pre-boot execution environment (PXE).

In an embodiment, the step (b) further includes: the deployment management platform informing the IP to a trivial file transfer protocol (TFTP).

In an embodiment, the agent includes a hypervisor and an internet small computer system interface (iSCSI) target service system.

In an embodiment, the deployed server provides its hardware information to the deployment management platform through the hypervisor and the deployed server shares the hard disk through the iSCSI target service system.

In an embodiment, in the step (e), the deployment management platform automatically detects the deployed server and adds the deployed server to the deployment management platform.

In an embodiment, in the step (g), the operating system installed to the hard disk shared by the deployed server is Linux operating system or Windows operating system.

In an embodiment, the deployed server and the deployment management platform are located in the same local area network (LAN), and the LAN includes a dynamic host configuration protocol (DHCP) server and a TFTP server IP is specified to the deployment management platform.

In an embodiment, the deployed server is deployed at a remote end by an administrator through a web-based user interface (UI).

In an embodiment, a device at a user end is connected to the deployment management platform to monitor the installation of the operating system to the hard disk shared by the deployed server.

Another preferred embodiment of the invention is a server deployment system in a hypervisor architecture. In this embodiment, the server deployment system includes a deployment management platform and at least one deployed server. When the deployed server requests an internet protocol (IP), the deployment management platform distributes the IP. When the deployed server requests an agent, the deployment management platform delivers the agent. The deployed server automatically joins the deployment management platform. The deployment management platform mounts a hard disk shared by the deployed server. The deployment management platform selects a type of a central processing unit (CPU) and installs an operating system to the hard disk shared by the deployed server. A connection of a monitor screen is established between the deployment management platform and the deployed server.

Compared to the prior art, the server deployment method and system in the hypervisor architecture in the invention can remote installation and rapid deployment of the operating system without specific hardware and software support. The server deployment method and system can provide the following functions and advantages of:

(1) supporting the remote installation of cross-operating systems such as Linux and Windows;

(2) no need to manually install specific software on the deployed server:

(3) when the OS of the server is installed remotely, the related device (e.g., the KVM switch over IP) or related software (e.g., the remote monitoring software built in the BMC) is unnecessary;

(4) providing deployments of the infrastructure-as-a-service (IaaS); and (5) achieving server management and server provisioning through a specific software AMI Composer).

The advantage and spirit of the invention may be understood by the following detailed descriptions together with the appended drawings.

BRIEF DESCRIPTION OF THE APPENDED DRAWINGS

FIG. 3 illustrates a schematic diagram of the server deployment system in another embodiment of the invention.

DETAILED DESCRIPTION OF THE INVENTION

A preferred embodiment of the invention is a server deployment method in a hypervisor architecture. In this embodiment, the server deployment method is performed between a deployment management platform and at least one deployed server, but not limited to this.

It should be noticed that the server deployment method of the invention can support the remote installation of cross-operating systems (e.g., Linux and Windows) without manually installing specific software on the deployed server and without any related device (e.g., the KVM switch over IP) and related software (e.g., the remote monitoring software built in the BMC), so that the server deployment method of the invention can provide deployments of the infrastructure-as-a-service (IaaS) and achieve server management and server provisioning through a specific software (e.g., AMI Composer).

Figure 1:
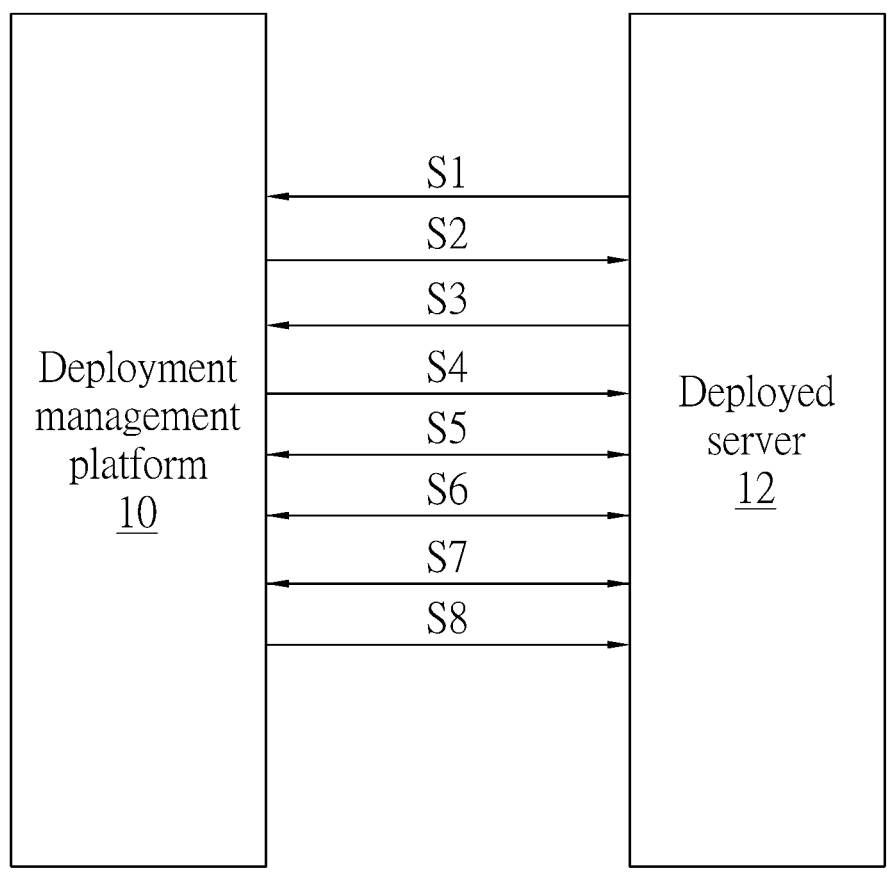
FIG. 1 illustrates a schematic diagram showing that the server deployment method performed between the deployment management platform and the deployed server includes the steps S1~S8.
Figure 2:
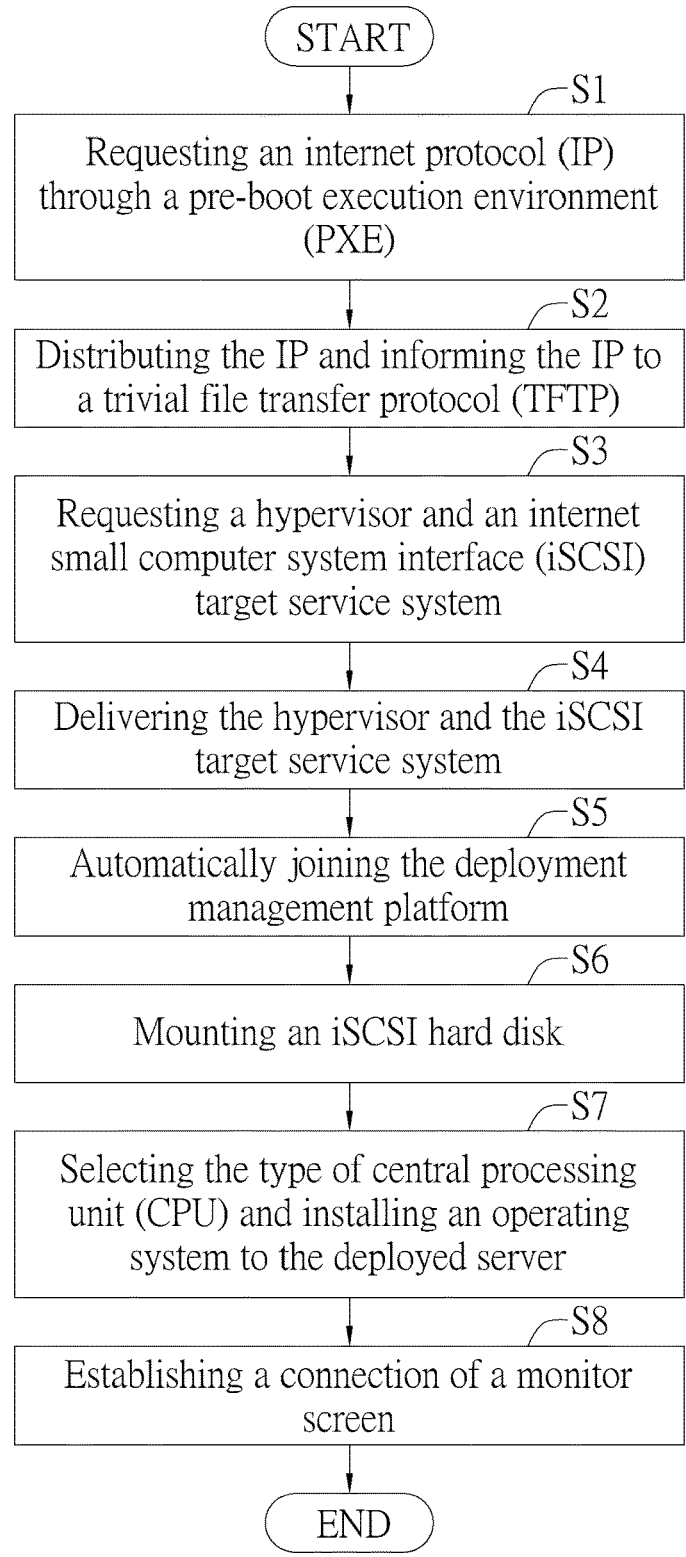
FIG. 2 illustrates a flowchart of the server deployment method including the steps S1~S8 in an embodiment of the invention.

Please refer to FIG. 1 and FIG. 2. FIG. 1 illustrates that the server deployment method performed between the deployment management platform and the deployed server includes the steps S1~S8. FIG. 2 illustrates a flowchart of the server deployment method including the steps S1~S8.

As shown in FIG. 1, when the server deployment method of the invention is performed between the deployment management platform 10 and the deployed server 12, the step S1 is performed from the deployed server 12 to the deployment management platform 10, the step S2 is performed from the deployment management platform 10 to the deployed server 12, the step S3 is performed from the deployed server 12 to the deployment management platform 10, the step S4 is performed from the deployment management platform 10 to the deployed server 12, the steps S5~S7 are performed in both directions, and the step S8 is performed from the deployment management platform 10 to the deployed server 12.

As shown in FIG. 2, the server deployment method of the invention is performed between the deployment management platform 10 and the deployed server 12 includes the following steps S1~S8:

step S1: the deployed server 12 requesting an internet protocol (IP) through a pre-boot execution environment (PXE);

step S2: the deployment management platform 10 distributing the IP and informing the IP to a trivial file transfer protocol (TFTP);

step S3: the deployed server 12 requesting a hypervisor and an Internet small computer system interface (iSCSI) target service system;

step S4: the deployment management platform 10 delivering the hypervisor and the iSCSI target service system;

step S5: the deployed server 12 automatically joining the deployment management platform 10;

step S6: the deployment management platform 10 mounting an iSCSI hard disk shared by the deployed server 12;

step S7: the deployment management platform 10 selecting the type of central processing unit (CPU) and installing an operating system to the hard disk shared by the deployed server 12; and the step S8: establishing a connection of a monitor screen between the deployment management platform 10 and the deployed server 12.

According to the steps S1~S2 of the server deployment method, it can be found that the deployed server 12 requests the IP from the deployment management platform 10 through the PXE, and then the deployment management platform 10 distributes the IP to the deployed server 12 and informs the IP to the TFTP.

In practical applications, the deployed server 12 should be adjusted to boot in a network boot way (e.g., the PXE). The deployed server 12 and the deployment management platform 10 should be located in the same local area network (LAN), and this LAN should include a dynamic host configuration protocol (DHCP) server and the TFTP server IP should be specified to the deployment management platform 10.

According to the steps S3~S4 of the server deployment method, it can be found that the deployed server 12 requests the hypervisor and the iSCSI target service system from the deployment management platform 10, and then the deployment management platform 10 delivers the hypervisor and the iSCSI target service system to the deployed server 12.

According to the steps S5~S6 of the server deployment method, it can be found that the deployed server 12 automatically joins the deployment management platform 10 and then the iSCSI hard disk is mounted on the deployed server 12.

In practical applications, the hypervisor can be a bare-metal hypervisor, but not limited to this. The deployed server 12 can provide its hardware information (e.g., the CPU, the network card) through the hypervisor, but not limited to this. The deployed server 12 can share the hard disk through the iSCSI target service system, but not limited to this. The deployment management platform 10 can automatically detect the deployed server 12 and add the deployed server 12 to the deployment management platform 10, but not limited to this. The deployment management platform 10 can mount the iSCSI hard disk on the deployed server 12 through the iSCSI initiator, but not limited to this.

According to the steps S7~S8 of the server deployment method, it can be found that the deployment management platform 10 selects the type of CPU and starts to install the OS to the deployed server 12, and then the deployment management platform 10 can establish the connection of the monitor screen from the deployed server 12, so that the deployment management platform 10 can monitor the OS installation process on the deployed server 12.

In practical applications, since the deployed server 12 provides its hardware information (e.g., the CPU, the network card) through the hypervisor, the deployment management platform 10 can select the type of CPU according to the hardware information provided by the hypervisor, but not limited to this. The deployment management platform 10 can perform local installation of the OS on the hard disk shared by the deployed server 12 through a simulation machine, but not limited to this.

Another preferred embodiment of the invention is a server deployment system in a hypervisor architecture. In this embodiment, the server deployment system includes a deployment management platform and at least one deployed server, but not limited to this.

It should be noticed that the server deployment system of the invention can support the remote installation of cross-operating systems (e.g., Linux and Windows) without manually installing specific software on the deployed server and without any related device (e.g., the KVM switch over IP) and related software (e.g., the remote monitoring software built in the BMC), so that the server deployment system of the invention can provide deployments of the infrastructure-as-a-service (IaaS) and achieve server management and server provisioning through a specific software (e.g., AMI Composer).

Please refer to FIG. 3. FIG. 3 illustrates a schematic diagram of the server deployment system in this embodiment.

As shown in FIG. 3, the server deployment system can include a deployment management platform 10 and at least one deployed server 12. The deployed server 12 at a remote end in the server deployment system can be deployed by an administrator ADMIN through a web-based user interface (UI) 16, but not limited to this.

The deployment management platform 10 can include different deployment servers 100~103 and the different deployment servers 100~103 can provide different functions such as network boot and hypervisor platform, but not limited to this. The number of the deployed servers 12 can be determined according to practical conditions; for example, the administrator ADMIN can deploy thirty deployed servers 12 through the web-based UI 16, but not limited to this.

After the deployed server 12 is deployed, the deployed server 12 can request an IP from the deployment management platform 10 through a PXE, and the deployment management platform 10 will distribute the IP to the deployed server 12 and informs the IP to a TFTP.

Then, the deployed server 12 can request a hypervisor and an iSCSI target service system from the deployment management platform 10, and the deployment management platform 10 will deliver the hypervisor (e.g., the bare-metal hypervisor) and the iSCSI target service system to the deployed server 12.

Afterward, the deployed server 12 will automatically join the deployment management platform 10 and then the iSCSI hard disk will be mounted on the deployed server 12. And then, the deployment management platform 10 will select the type of CPU and start to install the OS to the deployed server 12, and then the deployment management platform 10 can establish the connection of the monitor screen from the deployed server 12. The computer 14 at a user end can connect to the deployment management platform 10 through the remote desktop protocol (RDP) or the virtual network computing (VNC), so that the users USER can monitor the OS installation process on the deployed server 12 through the computer 14, but not limited to this.

Compared to the prior art, the server deployment method and system in the hypervisor architecture in the invention can remote installation and rapid deployment of the operating system without specific hardware and software support. The server deployment method and system can provide the following functions and advantages of:

(1) supporting the remote installation of cross-operating systems such as Linux and Windows;

(2) no need to manually install specific software on the deployed server;

(3) when the OS of the server is installed remotely, the related device (e.g., the KVM switch over IP) or related software (e.g., the remote monitoring software built in the BMC) is unnecessary;

(4) providing deployments of the infrastructure-as-a-service (IaaS): and (5) achieving server management and server provisioning through a specific software (e.g., AMI Composer).

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A server deployment method in a hypervisor architecture, applied between a deployment management platform and at least one deployed server, comprising steps of:
    (a) the deployed server requesting an internet protocol (IP);
    (b) the deployment management platform distributing the IP;
    (c) the deployed server requesting an agent comprising a hypervisor;
    (d) the deployment management platform delivering the agent;
    (e) the deployed server automatically joining the deployment management platform;
    (f) the deployment management platform mounting a remote hard disk shared by the deployed server;
    (g) the deployment management platform selecting a type of a central processing unit (CPU) according to hardware information provided by the hypervisor and performing local installation of an operating system on the remote hard disk shared by the deployed server through a simulation machine; and
    (h) establishing a connection of a monitor screen between the deployment management platform and the deployed server.

2. The server deployment method of claim 1, wherein in the step (a), the deployed server requests the IP through a pre-boot execution environment (PXE).

3. The server deployment method of claim 1, wherein the step (b) further comprises:
    the deployment management platform informing the IP to a trivial file transfer protocol (TFTP).

4. The server deployment method of claim 1, wherein the agent further comprises an internet small computer system interface (iSCSI) target service system.

5. The server deployment method of claim 4, wherein the deployed server provides its hardware information to the deployment management platform through the hypervisor and the deployed server shares the remote hard disk through the iSCSI target service system.

6. The server deployment method of claim 1, wherein in the step (e), the deployment management platform automatically detects the deployed server and adds the deployed server to the deployment management platform.

7. The server deployment method of claim 1, wherein in the step (g), the operating system installed to the remote hard disk shared by the deployed server is Linux operating system or Windows operating system.

8. The server deployment method of claim 1, wherein the deployed server and the deployment management platform are located in the same local area network (LAN), and the LAN comprises a dynamic host configuration protocol (DHCP) server and a TFTP server IP is specified to the deployment management platform.

9. The server deployment method of claim 1, wherein the deployed server is deployed at a remote end by an administrator through a web-based user interface (UI).

10. The server deployment method of claim 1, wherein a device at a user end is connected to the deployment management platform to monitor the installation of the operating system to the remote hard disk shared by the deployed server.

11. A server deployment system in a hypervisor architecture, comprising:
a deployment management platform; and
at least one deployed server;
wherein when the deployed server requests an internet protocol (IP), the deployment management platform distributes the IP; when the deployed server requests an agent comprising a hypervisor, the deployment management platform delivers the agent; the deployed server automatically joins the deployment management platform; the deployment management platform mounts a remote hard disk shared by the deployed server; the deployment management platform selects a type of a central processing unit (CPU) according to hardware information provided by the hypervisor and performs local installation of an operating system on the remote hard disk shared by the deployed server through a simulation machine; and a connection of a monitor screen is established between the deployment management platform and the deployed server.

12. The server deployment system of claim 11, wherein the deployed server requests the IP through a pre-boot execution environment (PXE).

13. The server deployment system of claim 11, wherein the deployment management platform further informs the IP to a trivial file transfer protocol (TFTP).

14. The server deployment system of claim 11, wherein the agent further comprises an internet small computer system interface (iSCSI) target service system.

15. The server deployment system of claim 14, wherein the deployed server provides its hardware information to the deployment management platform through the hypervisor and the deployed server shares the remote hard disk through the iSCSI target service system.

16. The server deployment system of claim 11, wherein the deployment management platform automatically detects the deployed server and adds the deployed server to the deployment management platform.

17. The server deployment system of claim 11, wherein the operating system installed to the remote hard disk shared by the deployed server is Linux operating system or Windows operating system.

18. The server deployment system of claim 11, wherein the deployed server and the deployment management platform are located in the same local area network (LAN), and the LAN comprises a dynamic host configuration protocol (DHCP) server and a TFTP server IP is specified to the deployment management platform.

19. The server deployment system of claim 11, wherein the deployed server is deployed at a remote end by an administrator through a web-based user interface (UI).

20. The server deployment system of claim 11, wherein a device at a user end is connected to the deployment management platform to monitor the installation of the operating system to the remote hard disk shared by the deployed server.

* * * * *